(12) United States Patent
Mohan et al.

(10) Patent No.: US 10,431,237 B2
(45) Date of Patent: Oct. 1, 2019

(54) DEVICE AND METHOD FOR ADJUSTING SPEECH INTELLIGIBILITY AT AN AUDIO DEVICE

(71) Applicant: MOTOROLA SOLUTIONS, INC., Chicago, IL (US)

(72) Inventors: Glenn Andrew Mohan, Plantation, FL (US); Maurice D. Howell, Lauderhill, FL (US); Juan J. Giol, Davie, FL (US); Christian Ibarra, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 57 days.

(21) Appl. No.: 15/702,815

(22) Filed: Sep. 13, 2017

(65) Prior Publication Data

US 2019/0080708 A1 Mar. 14, 2019

(51) Int. Cl.
| | | |
|---|---|---|
| *G10L 15/20* | (2006.01) | |
| *G10L 21/02* | (2013.01) | |
| *G10L 15/22* | (2006.01) | |
| *G10L 25/51* | (2013.01) | |
| *G10L 25/84* | (2013.01) | |

(Continued)

(52) U.S. Cl.
CPC .......... *G10L 21/0205* (2013.01); *G10L 15/22* (2013.01); *G10L 21/0364* (2013.01); *G10L 25/51* (2013.01); *G10L 25/60* (2013.01); *G10L 25/84* (2013.01); *G10L 25/21* (2013.01); *G10L 2021/03646* (2013.01)

(58) Field of Classification Search
CPC . G10L 25/78; G10L 21/0208; G10L 21/0232; G10L 15/02; G10L 15/063; G10L 15/12; G10L 15/26; G10L 21/02; G10L 21/0264; G10L 21/0324; G10L 21/034; G10L 25/81; G10L 25/90; H04R 2410/07; H04R 2430/01; H04R 2499/13; H04R 3/005; H04R 3/12
USPC ..... 704/233, 226–227, 201, 270, 270.1, 275
See application file for complete search history.

(56) References Cited

U.S. PATENT DOCUMENTS

| | | |
|---|---|---|
| 7,574,361 B2 | 8/2009 | Yeager et al. |
| 7,599,507 B2 | 10/2009 | Hanser |

(Continued)

FOREIGN PATENT DOCUMENTS

EP  1672898 A2  6/2006

OTHER PUBLICATIONS

Akiko Amano-Kusumoto, et al, "A Review of Research on Speech Intelligibility and Correlations with Acoustic Features", CSLU-011-001, Technical Report, Mar. 2011.

*Primary Examiner* — Vijay B Chawan
(74) *Attorney, Agent, or Firm* — Perry + Currier, Inc.

(57) ABSTRACT

A device and method for adjusting speech intelligibility at an audio device is provided. The device comprises a microphone, a transmitter and a controller. The controller is configured to: determine a noise level at the microphone; select a voice tag, of a plurality of voice tags, based on the noise level, each of the plurality of voice tags associated with respective noise levels; determine an intelligibility rating of a mix of the voice tag and noise received at the microphone; and when the intelligibility rating is below a threshold intelligibility rating, enhance speech received the microphone based on the intelligibility rating prior to transmitting, at the transmitter, a signal representing intelligibility enhanced speech.

20 Claims, 13 Drawing Sheets

(51) Int. Cl.
*G10L 21/0364* (2013.01)
*G10L 25/60* (2013.01)
*G10L 25/21* (2013.01)

(56) References Cited

U.S. PATENT DOCUMENTS

| | | | | |
|---|---|---|---|---|
| 8,175,886 B2* | 5/2012 | Odinak | ............ | G10L 15/26 704/270.1 |
| 8,554,556 B2* | 10/2013 | Yu | ............ | G10L 25/78 704/233 |
| 9,373,340 B2* | 6/2016 | Hetherington | ...... | G10L 21/0208 |
| 2011/0093427 A1* | 4/2011 | Waite | ............ | G06N 99/005 706/52 |
| 2011/0106533 A1* | 5/2011 | Yu | ............ | G10L 25/78 704/233 |
| 2013/0041660 A1* | 2/2013 | Waite | ............ | G06N 99/005 704/226 |
| 2013/0188032 A1* | 7/2013 | Vertegaal | ............ | G06F 3/011 348/78 |
| 2017/0011753 A1* | 1/2017 | Herbig | ............ | H04R 3/00 |
| 2017/0103748 A1* | 4/2017 | Weissberg | ............ | G10L 15/02 |

* cited by examiner

DEVICE AND METHOD FOR ADJUSTING SPEECH INTELLIGIBILITY AT AN AUDIO DEVICE

BACKGROUND OF THE INVENTION

Users of radios (such as cell phones, and the like), have no way of knowing whether or not their transmitted speech is intelligible, except when users of receiver radios, and the like, notify the user, for example using the radio and the like, and/or email, text messages, etc. The problem may be particularly critical when the users of the radios transmitting unintelligible speech are first responders, such as police officers, fire fighters, paramedics and the like. Indeed, for mission-critical audio. Indeed, it is very important in these scenarios that intelligibility of transmitted speech be as high as possible as otherwise, the critical information may not be conveyed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
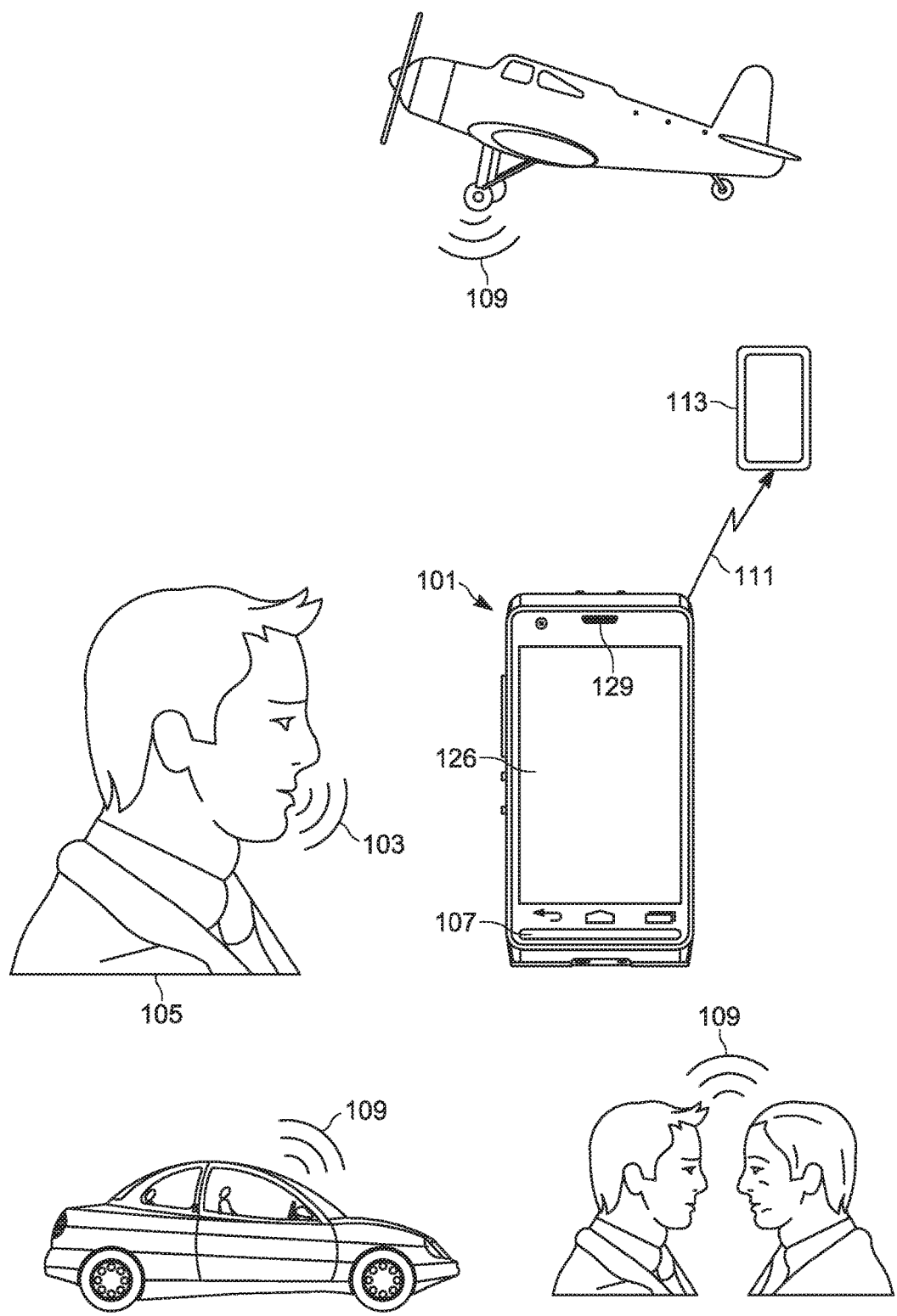
FIG. 1 is a schematic perspective view of an audio device for adjusting speech intelligibility in use by a user in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a microphone; a transmitter; and a controller configured to: determine a noise level at the microphone; select a voice tag, of a plurality of voice tags, based on the noise level, each of the plurality of voice tags associated with respective noise levels; determine an intelligibility rating of a mix of the voice tag and noise received at the microphone; and when the intelligibility rating is below a threshold intelligibility rating, enhance speech received the microphone based on the intelligibility rating prior to transmitting, at the transmitter, a signal representing intelligibility enhanced speech.

Another aspect of the specification provides a method comprising: determining, at a controller of a device, a noise level at a microphone of the device; selecting, at the controller, a voice tag, of a plurality of voice tags, based on the noise level, each of the plurality of voice tags associated with respective noise levels; determining, at the controller, an intelligibility rating of a mix of the voice tag and noise received at the microphone; and when the intelligibility rating is below a threshold intelligibility rating, enhancing, using the controller, speech received the microphone based on the intelligibility rating prior to transmitting, at a transmitter of the device, a signal representing intelligibility enhanced speech.

Figure 2:
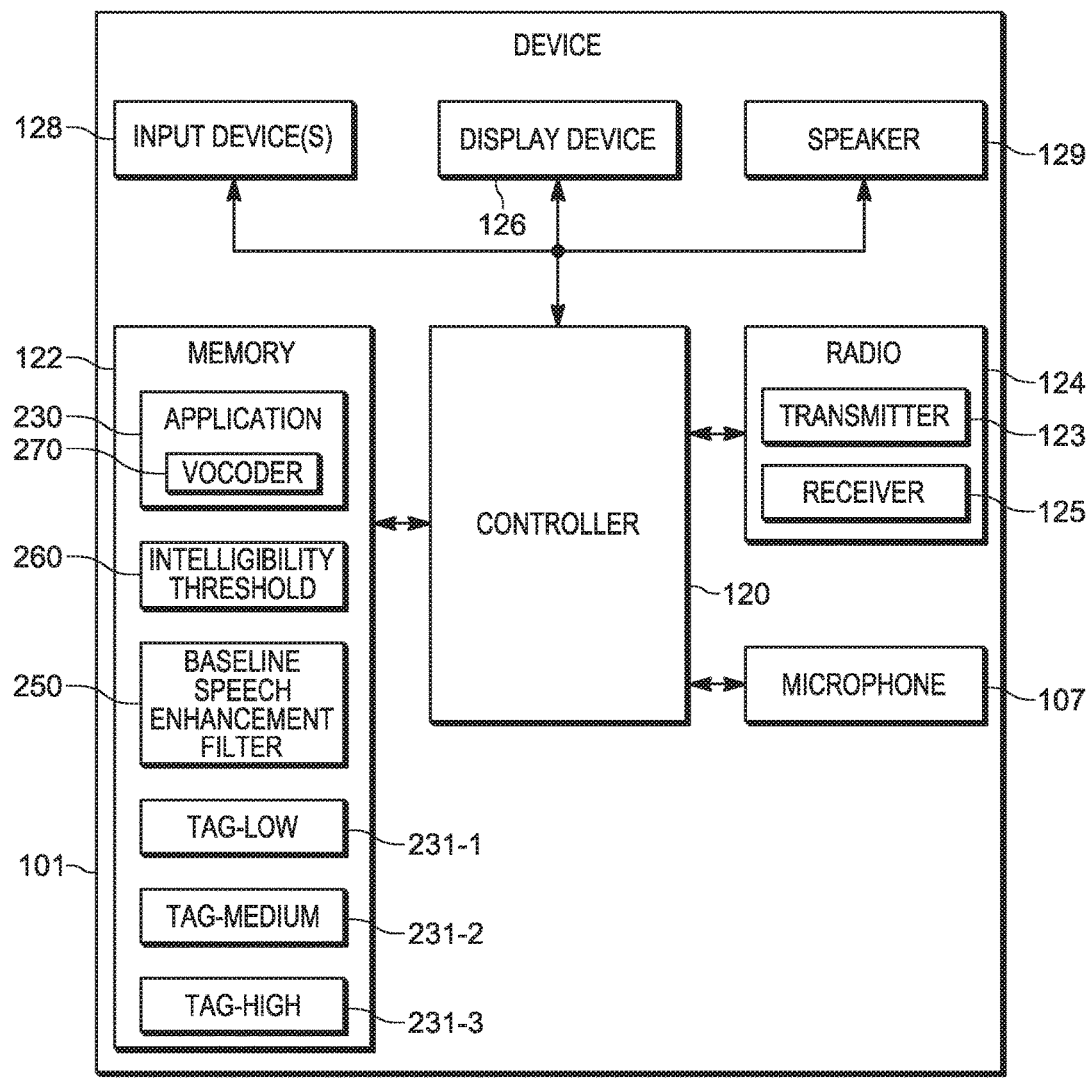
FIG. 2 is a schematic block diagram of the audio device in accordance with some embodiments.

Attention is directed to FIG. 1, which depicts a perspective view of an audio device 101, interchangeably referred to hereafter as the device 101 and FIG. 2 which depicts a schematic block diagram of the device 101.

With reference to FIG. 1, the device 101 may be in use as a radio, receiving speech 103 from a user 105 at a microphone 107. However, the microphone 107 also receives ambient noise 109, for example from, for example, cars, airplanes, people etc. Indeed, the microphone 107 receives the speech 103 and the noise 109 as sound, and the device 101 generally encodes the sound to a signal 111 which is transmitted by the device 101 (e.g. to another device 113), where the signal 111 is converted into sound, and played by a speaker (not depicted) at the device 113. However, the noise 109 may render the speech 103 encoded in the signal 111 unintelligible. For example, the speech 103 combined with the noise 109 may have a poor signal-to-noise ratio ("SNR") and/or the noise 109 may overwhelm frequencies in the speech 103 associated with intelligibility. As will be described below, however, the device 101 is generally configured to analyze the noise received at the microphone, as well as preconfigured customized reference voice tags, to determine an intelligibility rating, and enhance the speech based on the intelligibility rating.

With reference to FIG. 2, the device 101 includes: a controller 120, a memory 122, a transmitter 123, at least one input device 128 (interchangeably referred to the input device 128), and a speaker 129.

As depicted, device 101 further includes a radio 124, the transmitter 123 being a component of the radio 124, the radio 124 further including a receiver 125. Hence, the radio 124 may be used to conduct an audio call, and the like, with the device 113, and the like.

As depicted, the memory 122 stores: an application 230, a plurality of voice tags 231-1, 231-2, 231-3 each associated with respective noise levels (e.g. respective ambient noise levels), a baseline speech enhancement filter 250, and an intelligibility threshold 260. The plurality of voice tags 231-1, 231-2, 231-3 will be interchangeably referred to hereafter, collectively, as the voice tags 231 and, generically, as a voice tag 231.

As depicted, the device 101 generally comprises a mobile device which includes, but is not limited to, any suitable combination of electronic devices, communication devices, computing devices, portable electronic devices, mobile computing devices, portable computing devices, tablet computing devices, laptop computers, telephones, PDAs (personal digital assistants), cellphones, smartphones, e-readers, mobile camera devices and the like. Other suitable devices are within the scope of present embodiments including non-mobile devices, any suitable combination of work stations, servers, personal computers, dispatch terminals, operator terminals in a dispatch center, and the like. Indeed, any device for conducting audio calls, including but not limited to radio calls, push-to-talk calls, and the like, is within the scope of present embodiments.

In some embodiments, the device 101 is specifically adapted for emergency service radio functionality, and the like, used by emergency responders and/or first responders, including, but not limited to, police service responders, fire service responders, emergency medical service responders, and the like. In some of these embodiments, the device 101 further includes other types of hardware for emergency service radio functionality, including, but not limited to, push-to-talk ("PTT") functionality; for example, in some embodiments, the transmitter 123 is adapted for push-to-talk functionality. However, other devices are within the scope of present embodiments. Furthermore, the device 101 may be incorporated into a vehicle, and the like (for example an emergency service vehicle), as a radio, an emergency radio, and the like.

In yet further embodiments, the device 101 includes additional or alternative components related to, for example, telephony, messaging, entertainment, and/or any other components that may be used with a communication device.

With reference to FIG. 2, the controller 120 includes one or more logic circuits configured to implement functionality for message thread switching. Example logic circuits include one or more processors, one or more microprocessors, one or more ASIC (application-specific integrated circuits) and one or more FPGA (field-programmable gate arrays). In some embodiments, the controller 120 and/or the device 101 is not a generic controller and/or a generic communication device, but a communication device specifically configured to implement intelligibility enhancement functionality. For example, in some embodiments, the device 101 and/or the controller 120 specifically comprises a computer executable engine configured to implement specific intelligibility enhancement functionality.

The memory 122 of FIG. 2 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 2, programming instructions (e.g., machine readable instructions) that implement the functional teachings of the device 101 as described herein are maintained, persistently, at the memory 122 and used by the controller 120 which makes appropriate utilization of volatile storage during the execution of such programming instructions.

In particular, the memory 122 of FIG. 2 stores instructions corresponding to an application 230 that, when executed by the controller 120, enables the controller 120 to: determine a noise level at the microphone 107; select a voice tag 231, of the plurality of voice tags 231, based on the noise level, each of the plurality of voice tags 231 associated with respective noise levels; determine an intelligibility rating of a mix of the voice tag 231 and noise received at the microphone 107; and when the intelligibility rating is below the intelligibility threshold 260, enhance speech received the microphone 107 based on the intelligibility rating prior to transmitting, at the transmitter 123, a signal representing intelligibility enhanced speech.

Indeed, as depicted, the application 230 includes a vocoder application 270 which, when executed by the controller 120, further enables the controller 120 to apply the baseline speech enhancement filter 250 to speech received at the microphone 107. For example, using the baseline speech enhancement filter 250, the vocoder application 270 may be used to generically implement noise reduction, echo cancellation, automatic gain control, parametric equalization, and the like, but without consideration of the intelligibility of the speech encoded in signals transmitted by the transmitter 123. Indeed, such "normal" speech enhancement may sometimes make intelligibility worse as it is generally based on the speech of an "average" speaker and "average" background noise and/or ambient, and may hence undesirably boost frequencies in the background/ambient noise and/or suppress frequencies in speech. The baseline speech enhancement filter 250 may represent a filter and/or a speech enhancement layer of the vocoder application 270.

The display device 126 comprises any suitable one of, or combination of, flat panel displays (e.g. LCD (liquid crystal display), plasma displays, OLED (organic light emitting diode) displays) and the like, as well as one or more optional touch screens (including capacitive touchscreens and/or resistive touchscreens). Hence, in some embodiments, the display device 126 comprises a touch electronic display.

The input device 128 may include, but is not limited to, a touch screen and/or a touch interface of a touch electronic display (e.g. at the display device 126), at least one pointing device, at least one touchpad, at least one joystick, at least one keyboard, at least one button, at least one knob, at least one wheel, combinations thereof, and the like.

The radio 124 (including the transmitter 123 and the receiver 125) is generally configured to communicate and/or wirelessly communicate, for example with the device 113 and the like using, for example, one or more communication channels, the radio 124 being implemented by, for example, one or more radios and/or antennas and/or connectors and/or network adaptors, configured to communicate, for example wirelessly communicate, with network architecture that is used to communicate with the device 113, and the like. The radio 124 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications. In yet further embodiments, the radio 124 includes one or more local area network or personal area network transceivers operating in accordance with an IEEE 802.11 standard (e.g., 802.11a, 802.11b, 802.11g), or a Bluetooth transceiver. In some embodiments, the radio 124 is further configured to communicate "radio-to-radio" on some communication channels, while other communication channels are configured to use wireless network infrastructure.

Example communication channels over which the radio 124 is generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

Indeed, the term "channel" and/or "communication channel", as used herein, includes, but is not limited to, a physical radio-frequency (RF) communication channel, a logical radio-frequency communication channel, a trunking talk-group (interchangeably referred to herein a "talkgroup"), a trunking announcement group, a VOIP communication path, a push-to-talk channel, and the like.

The microphone 107 includes any microphone configured to receive sound and convert the sound to data and/or signals for enhancement by the controller 120, and transmission by the transmitter 123. Similarly, the speaker 129 comprises any speaker configured to convert data and/or signals to sound, including, but not limited to, data and/or signals received.

While not depicted, in some embodiments, the device 101 include a battery that includes, but is not limited to, a rechargeable battery, a power pack, and/or a rechargeable power pack. However, in other embodiments, the device 101 is incorporated into a vehicle and/or a system that includes a battery and/or power source, and the like, and power for the device 101 is provided by the battery and/or power system of the vehicle and/or system; in other words, in such embodiments, the device 101 need not include an internal battery.

Figure 3:
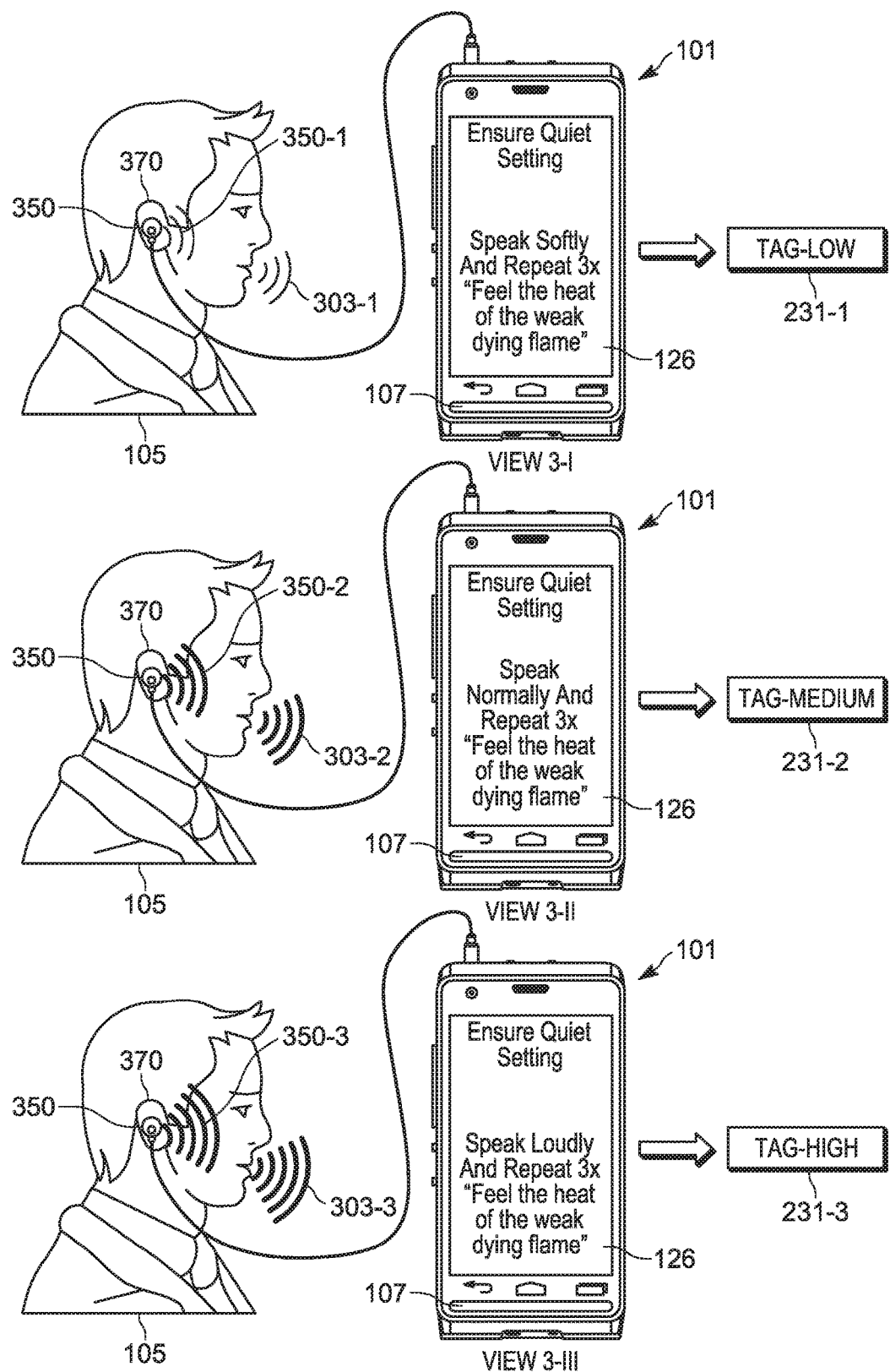
FIG. 3 depicts generation of voice tags associated with different ambient noise levels in accordance with some embodiments.

Attention is next directed to FIG. 3 which depicts generation of the voice tags 231. In general, human beings speak according to the Lombard Reflex, the involuntary tendency of people speaking to increase their vocal effort and/or speech patterns when speaking in loud ambient noise environments to enhance the audibility of their voice. This change includes not only changes in loudness but also other acoustic features such as pitch, rate, and duration of syllables and/or vowel elongation, shift in speaking frequencies etc. Such changes affect the intelligibility of speech and vocoders using a "normal" and/or a "standard" and/or a "baseline" speech enhancement filter (such as the baseline speech enhancement filter 250) may reduce the intelligibility of speech as such filters are generally based on the speech of an "average" speaker and "average" background/ambient noise.

Hence, to address these issues, the device 101 is provisioned with the voice tags 231, each of which comprises a respective voice recording associated with a respective Lombard Speech Level.

For example, in FIG. 3, the device 101 is controlled (e.g. by the controller 120 executing the application 230, and the like) to request that the user 105 records three different voice recordings at different speaking levels. For example, FIG. 3 depicts a sequence where the device 101 prompts the user 105 (e.g. via text provided at the display device 126) to speak, into the microphone 107, in a quiet voice 303-1 (e.g. in a View 3-I), a normal voice 303-2 (e.g. in a View 3-II), and a loud voice 303-3 (e.g. in a View 3-III). In particular, the device 101 prompts the user 105 to recite the phrase in each instance, as depicted "Feel the heat of the weak dying flame", however any phrase may be used, selected to include a range of phonemes. Furthermore, as depicted, the device 101 prompts the user 105 to recite the phrase, in each instance, three times, though the device 101 may prompt the user 105 to recite the phrase as few as one time, or more than three times. In embodiments where the device 101 prompts the user 105 to recite the phrase more than once, in each instance the controller 120 may determine the speech received at each recitation is within a given threshold range, for example +/−3 dB of each other. When this condition is met, then only one of the three voice tags in each instance may be stored. When this condition is not fulfilled, the device 101 may prompt the user 105 to continue reciting the phrase until the condition is met. Such a condition may ensure consistency in speaking level for each of the three speaking conditions.

At each recitation of the phrase in the quiet voice 303-1, the normal voice 303-2, and the loud voice 303-3, the user 105 will change their vocal effort and/or speech patterns according to the Lombard Reflex. Furthermore, at each recitation of the phrase in the quiet voice 303-1, the normal voice 303-2, and the loud voice 303-3, the device 101 records the phrase and stores the voice recording as a respective voice tag 231, each associated with respective noise levels (e.g. respective ambient noise levels).

Furthermore, regardless of the loudness of the speech of the user 105, the device 101 prompts the user 105 to speak in a quiet setting to reduce and/or eliminate background/ambient noise in the voice tags 231.

It is assumed that, regardless of background/ambient noise levels while the voice tag 231-1 is being recorded, the speech patterns of the "quiet" voice 303-1 (including the corresponding change to the voice 303-1 due to the Lombard Reflex) is indicative of the speech of the user 105 in a quiet setting and/or with a small amount of background noise. Similarly, is assumed that, regardless of background noise levels while the voice tag 231-2 is being recorded, the speech patterns of the "normal" voice 303-2 (including the corresponding change to the voice 303-2 due to the Lombard Reflex) is indicative of the speech of the user 105 in a normal setting and/or with an average amount of background noise. Similarly, is assumed that, regardless of background noise levels while the voice tag 231-3 is being recorded, the speech patterns of the "loud" voice 303-3 (including the corresponding change to the voice 303-2 due to the Lombard Reflex) is indicative of the speech of the user 105 in a loud setting and/or with a large amount of background noise.

Hence, the voice tag 231-1 is associated with a small noise level, the voice tag 231-2 is associated with an average noise level, and the voice tag 231-3 is associated with a high noise level.

Furthermore, while the terms "small", "quiet", "average", "normal", "loud", "high" used with regards to ambient noise levels are relative terms, such relative levels may be quantified. For example, a "quiet" and/or "small" ambient noise level may be defined as noise levels below about 35 dB, a "normal" and/or "average" ambient noise level may be defined as noise levels between about 35 dB and 65 dB, and a "loud" and/or "high" ambient noise level may be defined as noise levels above about 65 dB.

Indeed, to further assist the user 105 to speak in a voice that is associated with a respective noise level, the user 105 may wear headphones 350 on their ears 370, the headphones 350 in communication with the device 101, and the like, and during the recording of each of the voice tags 231. The device 101 may control the headphones 350 to emit noise according to an associated noise level. For example: in the View 3-I, the headphones are emitting noise 350-1 into the ear of the user 105 at a level of below about 35 dB; in the View 3-II, the headphones are emitting noise 350-2 into the ear of the user 105 at a level of between about 35 dB and 65 dB (e.g. around 50 dB); and in the View 3-III, the headphones are emitting noise 350-3 into the ear of the user 105 at a level of above about 65 dB. The user 105 will hence modulate their voice accordingly. Such embodiments assume that the microphone 107 is not picking up the noise 350-1, 350-2, 350-3; indeed, the headphones 350 may include, but are not limited to closed-back headphones to reduce noise leakage from the headphones 350 to the microphone 107.

Furthermore, during recording of the voice tags 231, the device 101 may determine the SNR of the voice tags 231 and, when the respective SNR of a voice tag 231 is above a threshold SNR (selected assuming that the recording is occurring in a quiet setting), the device 101 may prompt the user 105 (e.g. via the display device 126) to move to a quiet setting and/or adjust the headphones 350.

In any event, the voice tags 231 generally act as reference for a determination of intelligibility of speech of the user 105, used to adjust the intelligibility of the speech as transmitted by the transmitter 123 as described hereafter.

While only three voice tags 231 are described herein, other numbers of voice tags 231 are within the scope of present embodiments, including as few as two voice tag (e.g. associated with normal and high noise levels), and more than three voice tags 231 (e.g. associated a small noise level, a normal noise level and two or more high noise levels).

Furthermore, the voice tags 231 may be further stored with and/or associated with an identifier associated with the user 105 and/or stored remotely (e.g. at a device provisioning server) and retrieved by the device 101 when the user 105 uses the identifier to log-in to the device 101. Either way, the voice tags 231 are specifically associated with the user 105 and represent customized voice references of the user 105 speaking in different ambient noise environments.

Figure 4:
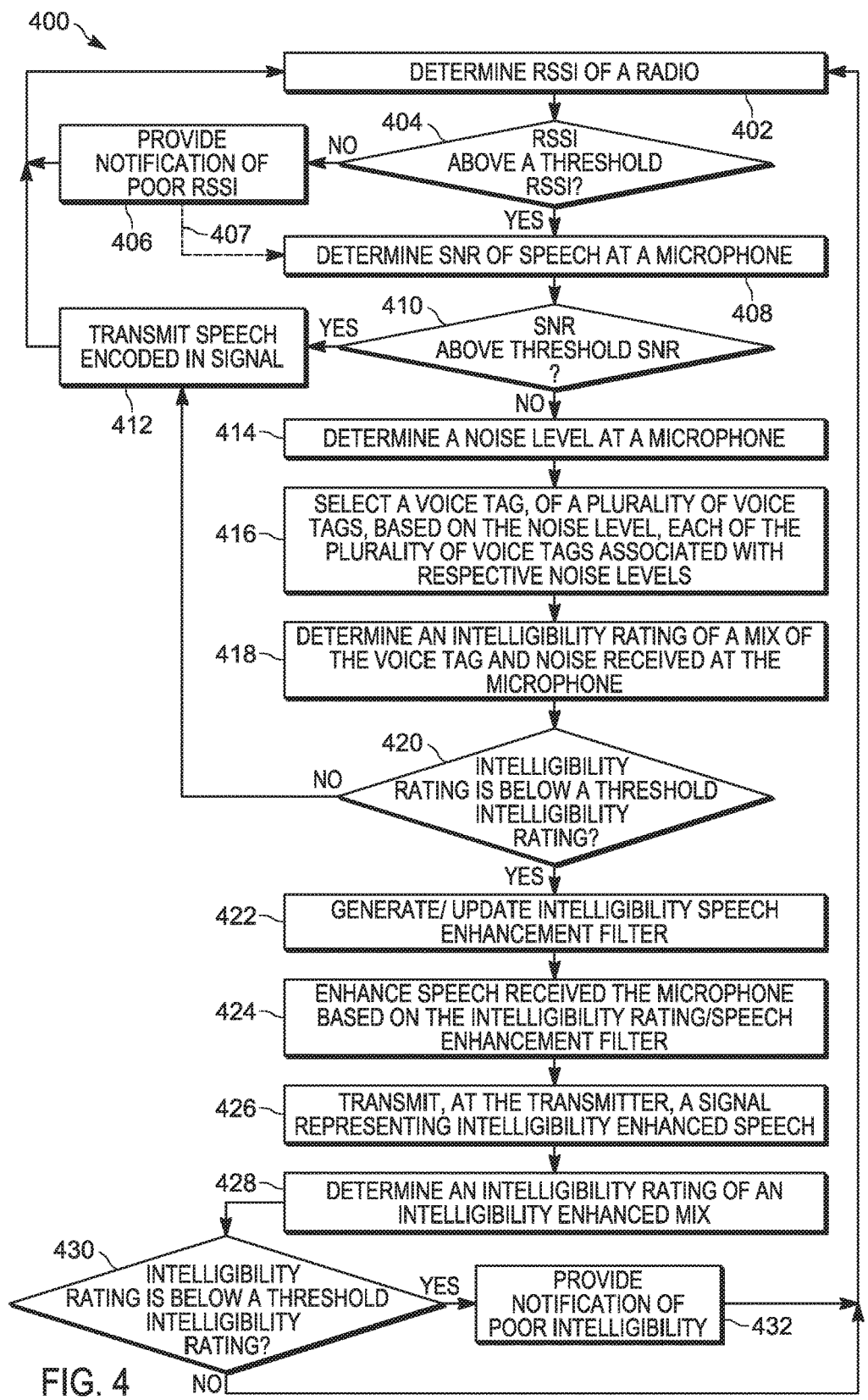
FIG. 4 is a flowchart of a method for adjusting speech intelligibility in use by a user in accordance with some embodiments.

Attention is now directed to FIG. 4 which depicts a flowchart representative of a method 400 for adjusting speech intelligibility at an audio device. The operations of the method 400 of FIG. 4 correspond to machine readable instructions that are executed by, for example, the device 101, and specifically by the controller 120 of the device 101. In the illustrated example, the instructions represented by the blocks of FIG. 4 are stored at the memory 122, for example, as the application 230 and/or the vocoder application 270. The method 400 of FIG. 4 is one way in which the controller 120 and/or the device 101 is configured. Furthermore, the following discussion of the method 400 of FIG. 4 will lead to a further understanding of the device 101, and its various components. However, it is to be understood that the device 101 and/or the method 400 may be varied, and need not work exactly as discussed herein in conjunction with each other, and that such variations are within the scope of present embodiments.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the device 101 of FIG. 1, as well.

It is further assumed in the method 400 that the controller 120 continuously samples and/or monitors sound received at the microphone 107 for example during a voice call at the device 101, the sound including noise and/or speech. However, such continuous sampling and/or monitoring may include, but is not limited to, periodic sampling and/or digital sampling, and hence such continuous sampling may include time periods where sampling and/or monitoring is not occurring (e.g. time periods between samples).

It is further assumed in the method 400 that speech received at the microphone 107 is received from the same user 105 whose voice was recorded in the voice tags 231. For example, the voice tags 231 may be associated with an identifier associated with the user 105, and when the user 105 logs into the device 101 using the identifier, the voice tags 231 may be retrieved from the memory 122, by the controller 120 for use in the method 400.

At a block 402, the controller 120 determines a received signal strength indicator (RSSI) of the radio 124, and, at the block 404, compares the RSSI to a threshold RSSI (e.g. as stored at the application 230 and/or in the memory 122). The threshold RSSI is generally selected to be an RSSI below which speech, when encoded in a signal transmitted by the transmitter 123 would not be intelligible, regardless of the remainder of the method 400. Such a threshold RSSI may be based on a type of the device 101 and/or factory data and/or manufacturer data for the device 101. For example, when the radio 124 comprises an analog radio, the RSSI threshold for the device 101 may be based on a 12 dB signal-to-noise and distortion ratio (SINAD) measurement, and when the radio 124 comprises a digital radio, the RSSI threshold for the device 101 may be based on a 5% bit error rate (BER). However, any suitable RSSI threshold for the device 101 is within the scope of present implementations.

The RSSI may be determined for one or more channels. Furthermore, the RSSI generally comprises a measurement of power present in a radio signal and/or a received radio signal; hence, while present embodiments are described with respect to RSSI, in other embodiments, other types of measurement of power may be used to determine power at the radio 124 including, but not limited to received channel power indicator (RCPI), and the like.

Continuing with the example of RSSI, however, when the RSSI is below the threshold RSSI (e.g. a "NO" decision at the block 404), at the block 406, the controller 120 provides a notification of poor RSSI at, for example, the display device 126 and/or the speaker 129 (and/or the headphones 350, when present). In some embodiments (as indicated using the arrow 407), the device 101 will continue with the method 400 regardless, however, in the depicted embodiments, the controller 120 repeats the blocks 402, 404, 406 until the RSSI of the radio 124 is above the threshold RSSI (e.g. a "YES" decision at the block 404).

Presuming a "YES" decision at the block 404, at the block 408, the controller 120 determines a signal-to-noise (SNR)

ratio of speech received at the microphone 107 and, at the block 410, compares the SNR to a threshold SNR. The threshold SNR is generally selected to be an SNR below which speech, when encoded in a signal transmitted by the transmitter 123 would not be intelligible even when enhanced with the baseline speech enhancement filter 250. For example, the threshold SNR may be about 5 dB.

When the SNR is above the threshold SNR (e.g. a "YES" decision at the block 410), at the block 412, the controller 120 transmits the speech received at the microphone 107 encoded in a signal transmitted by the transmitter 123 after, for example, adjusting and/or enhancing the speech (e.g. data and/or a signal representing the speech, as received by the microphone 107) using the baseline speech enhancement filter 250 and the vocoder application 270.

However, when the SNR is below the threshold SNR (e.g. a "NO" decision at the block 410, at the block 414, the controller 120 determines a noise level at the microphone 107. The block 414 may be implemented in conjunction with and/or as a part of the block 408 as determination of SNR may generally include a determination of noise level.

At the block 416, the controller 120 selects a voice tag 231, of the plurality of voice tags 231, based on the noise level determined at the block 414 (and/or the block 412), each of the plurality of voice tags 231 associated with respective noise levels.

At the block 418, the controller 120 determines an intelligibility rating of a mix of the voice tag 231 and noise received at the microphone 107. The noise used to determine the intelligibility rating may include, but is not limited to, the noise used to determine the noise level at the block 414 and/or the SNR at the block 412, and/or the noise used to determine the intelligibility rating may include another sampling of the noise at the microphone 107. Furthermore, the mix is adjusted, for example, to about match the SNR of the speech received at the microphone 107; and the SNR matched mix is enhanced, for example, using the baseline speech enhancement filter 250.

Hence, in general, the mix of the voice tag 231 and noise received at the microphone 107 represents how the noise received at the microphone 107, affects the speech received at the microphone 107 and, the mix further represents changes to the speech of the user 105 that occur due to the Lombard Reflex, as the voice tag 231 used to generate the mix represents how the user 105 speaks in the ambient noise level represented by the noise received at the microphone 107.

As such, a determination of the intelligibility of the mix represents a determination of the intelligibility of speech transmitted by the device 101, and the speech received at the microphone 107 may be adjusted accordingly to improve the intelligibility (e.g. as based on an adjustment of the mix). A direct determination of intelligibility of the speech received at the microphone 107 is generally challenging and/or not possible as the original content of the speech is not known independent of the noise received at the microphone 107. However, the original content of the voice tags 231 is known.

Determination of the intelligibility rating of the mix will be described in more detail below.

At the block 420, the controller 120 determines whether the intelligibility rating is below the intelligibility threshold 260. For example, the intelligibility rating may be a number between 0 and 1, and the intelligibility threshold 260 may be about 0.5 and/or midway between a lowest possible intelligibility rating and a highest possible intelligibility rating.

When the intelligibility rating is above the intelligibility threshold 260 (e.g. a "YES" decision at the block 420), the controller 120 implements the block 412 as described above.

However, when the intelligibility rating is below the intelligibility threshold 260 (e.g. a "NO" decision at the block 420), at the block 422 the controller 120 generates an intelligibility speech enhancement filter, as described below; if such intelligibility speech enhancement setting already exist (e.g. as stored in the memory 122), at the block 422, the controller 120 updates the intelligibility speech enhancement filter.

In general, the intelligibility speech enhancement filter is based on a comparison of the mix of the voice tag 231 and noise received at the microphone 107 compared with the voice tag 231, as described below with respect to FIG. 5.

At the block 424, the controller 120 enhances the speech received at the microphone 107 (e.g. as represented by data and/or a signal received at the controller 120 from the microphone 107) based on the intelligibility rating using, for example, the intelligibility speech enhancement filter generated and/or updated at the block 422.

At the block 426, the controller 120 transmits, using the transmitter 123, a signal representing intelligibility enhanced speech produced at the block 424.

In some embodiments, the method 400 repeats after the block 426, while in depicted example embodiments, at the block 428, the controller 120 determines an intelligibility rating of the mix of the voice tag 231 and noise received at the microphone 107 using the intelligibility speech enhancement filter to enhance the speech transmitted by the transmitter 123.

At the block 430, the controller 120 determines whether the intelligibility rating of the intelligibility enhanced mix is below the intelligibility threshold 260. When the intelligibility rating is above the intelligibility threshold 260 (e.g. a "YES" decision at the block 430), the controller 120 repeats the method 400.

However, when the intelligibility rating is below the intelligibility threshold 260 (e.g. a "NO" decision at the block 430), at the block 432 the controller 120, provides a notification of poor intelligibility at, for example, the display device 126 and/or the speaker 129 (and/or the headphones 350, when present), and the method 400 repeats.

The blocks 428, 430, 432 may, however, be performed in conjunction with and/or in parallel with any of the blocks 418 to 426. In other words, the mix of the voice tag 231 and the noise received at the microphone 107, as enhanced using the intelligibility speech enhancement filter, may be evaluated for intelligibility during implementation of any of the blocks 418 to 426.

Figure 5:
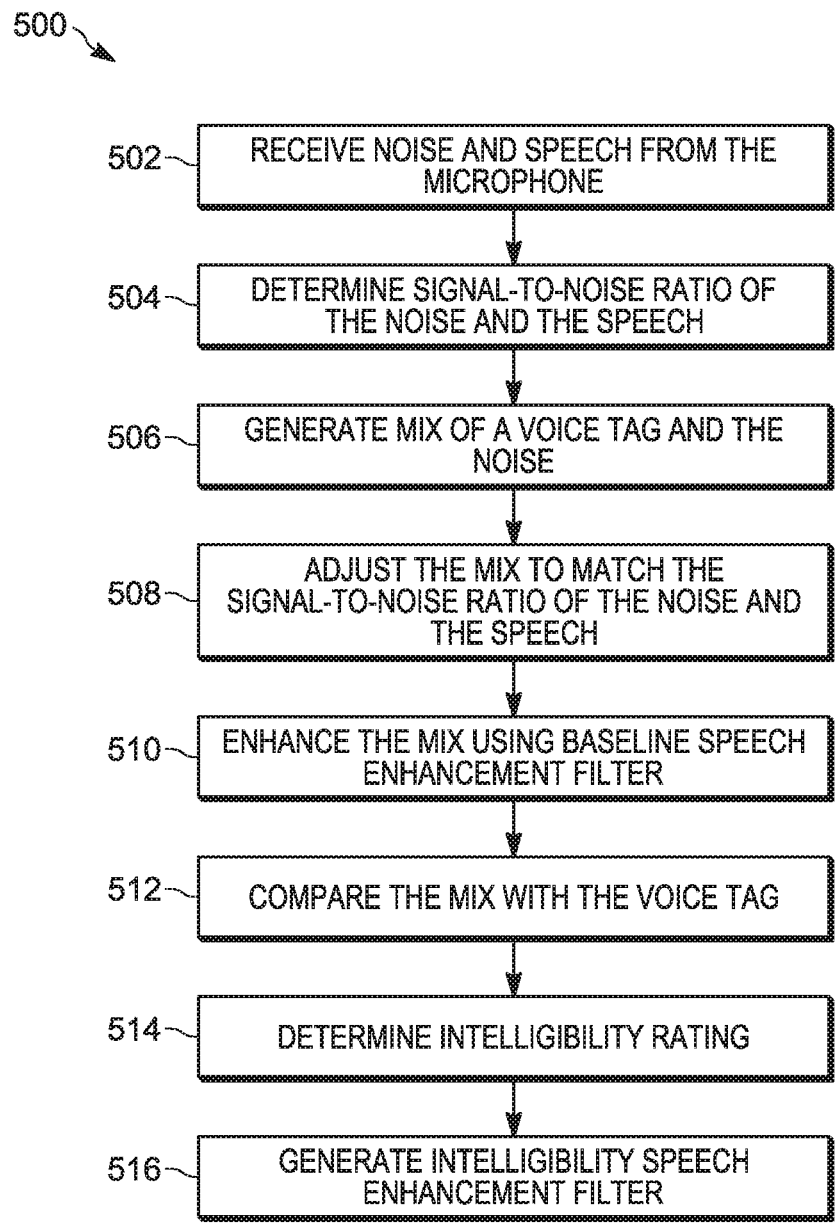
FIG. 5 is a flowchart of a method for determining an intelligibility rating in accordance with some embodiments.

Attention is now directed to FIG. 5 which depicts a flowchart representative of a method 500 for determining intelligibility of speech using at an audio device using preconfigured voice tags. The operations of the method 500 of FIG. 5 correspond to machine readable instructions that are executed by, for example, the device 101, and specifically by the controller 120 of the device 101. In the illustrated example, the instructions represented by the blocks of FIG. 5 are stored at the memory 122, for example, as the application 230 and/or the vocoder application 270. The method 500 of FIG. 5 is one way in which the controller 120 and/or the device 101 is configured. Furthermore, the following discussion of the method 500 of FIG. 5 will lead to a further understanding of the device 101, and its various components. However, it is to be understood that the device 101 and/or the method 500 may be varied, and need not work exactly as discussed herein in conjunction with each other, and that such variations are within the scope of present embodiments.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the device 101 of FIG. 1, as well.

At the block 502, the controller 120 receives noise and speech from the microphone 107, for example as data and/or a signal generated by the microphone 107. The block 502 is generally performed in conjunction with any of the blocks 402 to 414.

At the block 504, the controller 120 determines the SNR of the noise and speech from the microphone 107 as described above with respect to the block 408. Indeed, the block 504 may comprise the block 408.

At the block 506, the controller 120 generates a mix of the voice tag 231 selected at the block 416 (e.g. based on a noise level), as described above, and the noise received at the microphone 107.

At the block 508, the controller 120 adjusts the mix to match and/or about match the SNR determined at the block 504, for example by increasing or decreasing a relative level of the voice tag 231 in the mix.

At the block 510, the controller 120 enhances the mix (as adjusted to match the SNR determined at the block 508) using the baseline speech enhancement filter 250, as described above.

At the block 512, the controller 120 compares the mix (e.g. as adjusted at the block 508 and enhanced at the block 510) with the voice tag 231 selected at the block 416. In other words, the selected voice tag 231 represents speech without interference from noise, and the mix represents the same speech with interference from noise and further as enhanced using the baseline speech enhancement filter 250. Hence, a comparison thereof enables the controller 120 to determine how the noise and the baseline speech enhancement filter 250 are affecting intelligibility of speech received at the microphone 107.

At the block 514, the controller 120 determines an intelligibility rating, for example based on the comparison at the block 512. The block 514 may comprise the block 418 of the method 400.

For example, the intelligibility rating may be a number between 0 and 1. Furthermore, the controller 120 determines the intelligibility rating by: binning the mix based on frequency; and determining respective intelligibility ratings for a plurality of bins. In other words, speech in specific frequency ranges may contribute more to intelligibility than in other frequency ranges; for example, a frequency region of interest for speech communication systems can be in a range from about 50 Hz to about 7000 Hz and in particular from about 300 Hz to about 3400 Hz. Indeed, a midfrequency range from about 750 Hz to about 2381 Hz has been determined to be particularly important in determining speech intelligibility. Hence, a respective intelligibility rating may be determined for different frequencies and/or different frequency ranges, and a weighted average of such respective intelligibility rating may be used to determine the intelligibility rating at the block 514 with, for example, respective intelligibility ratings in a range of about 750 Hz to about 2381 Hz being given a higher weight than other frequency ranges.

Furthermore, there are various computational techniques available for determining intelligibility including, but not limited to, determining one or more of: amplitude modulation at different frequencies in the mix; speech presence or speech absence at different frequencies in the mix; respective noise levels at the different frequencies; respective reverberation at the different frequencies; respective signal-to-noise ratio at the different frequencies; speech coherence at the different frequencies; and speech distortion at the different frequencies.

Indeed, when comparing the mix with the selected voice tag 231, there are various analytical techniques available for quantifying speech intelligibility, including, but not limited to analytical techniques available for quantifying:

A. speech presence/absence (e.g. whether or not frequency patterns present in the selected voice tag 231 are present in the mix);

B. reverberation (e.g. time between repeated frequency patterns in the mix);

C. speech coherence (e.g. Latent Semantic Analysis); and

D. speech distortion (e.g. changes frequency patterns of the mix as compared to the selected voice tag 231).

Indeed, any technique for quantifying speech intelligibility is within the scope of present embodiments.

For example, speech presence/absence of the mix may be determined in range of about 750 Hz to about 2381 Hz, and a respective intelligibility rating may be determined for this range as well as above and below this range, with a highest weighting placed on the range of about 750 Hz to about 2381 Hz, and a lower weighting placed on the ranges above and below this range. A respective intelligibility rating may be determined for the frequency ranges using other analytical techniques available for quantifying speech intelligibility, with a higher weighting being placed on speech/presence absence and/or speech coherence than, for example, reverberation.

In this manner, an intelligibility rating is generated at the block 514 between, for example 0 and 1.

At the block 516, the controller 120 generates an intelligibility speech enhancement filter which, when applied to the mix (e.g. after adjusted for SNR at the block 508 and enhanced using the baseline speech enhancement filter 250 at the block 510) increases the intelligibility rating (e.g. which may be determined and evaluated at the blocks 428, 430).

The methods 400, 500 will now be described with respect to FIG. 6 through FIG. 13.

Figure 6:
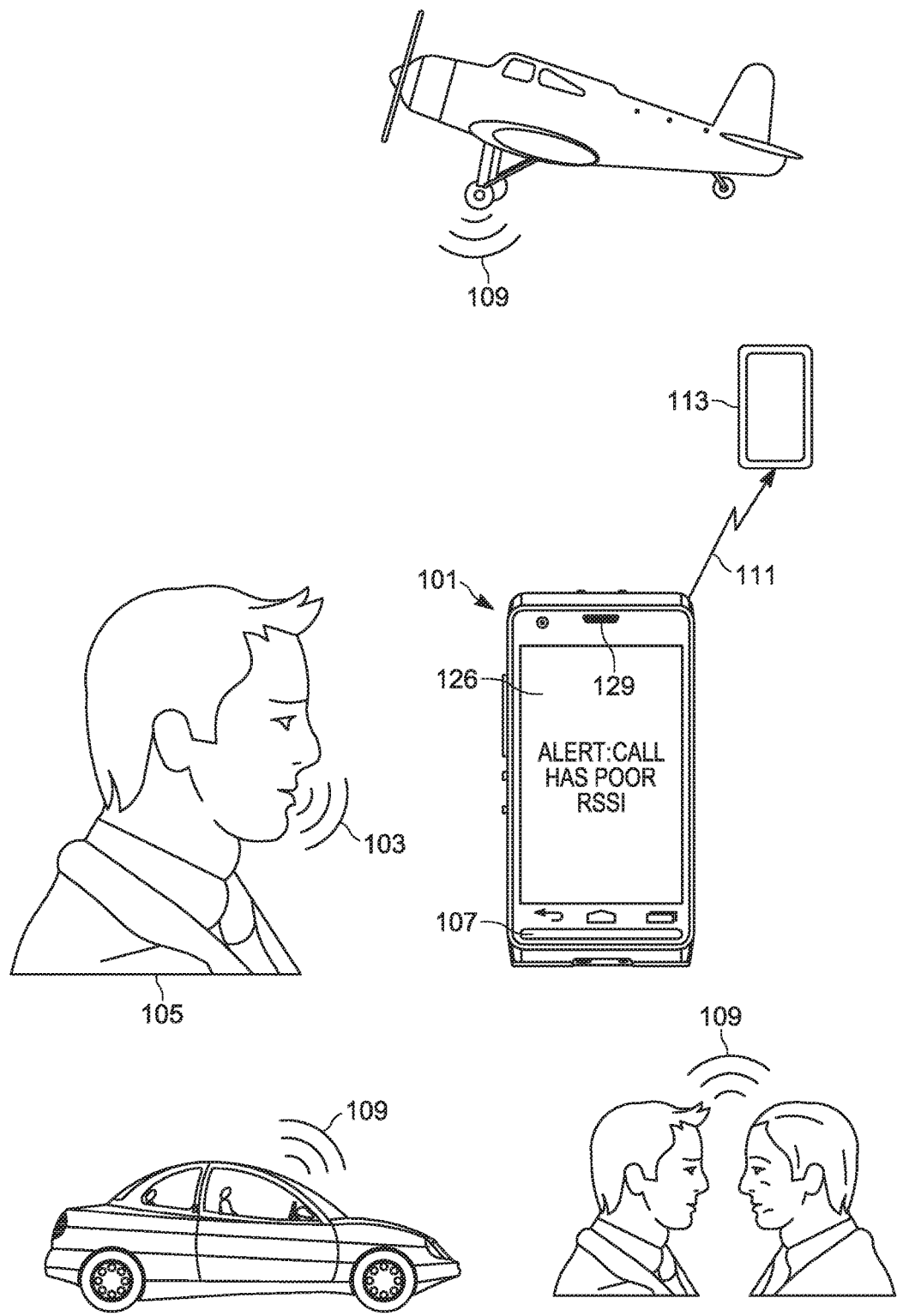
FIG. 6 depicts the audio device providing a notification of poor received signal strength in accordance with some embodiments.

Attention is first directed to FIG. 6, which is substantially similar to FIG. 1, with like elements having like numbers; however, in FIG. 6, the controller 120 is implementing the blocks 402, 404, 406 to determine that the RSSI of the radio 124 is below a threshold RSSI, and hence the controller 120 is controlling the display device 126 to provide a notification of poor RSSI, in the form of text "ALERT: CALL HAS POOR RSSI". Such an alert may alternatively be provided at the speaker 129 (and/or the headphones 350, when present), Such a notification may cause the user 105 to move the device 101 to a different location to improve RSSI.

Figure 7:
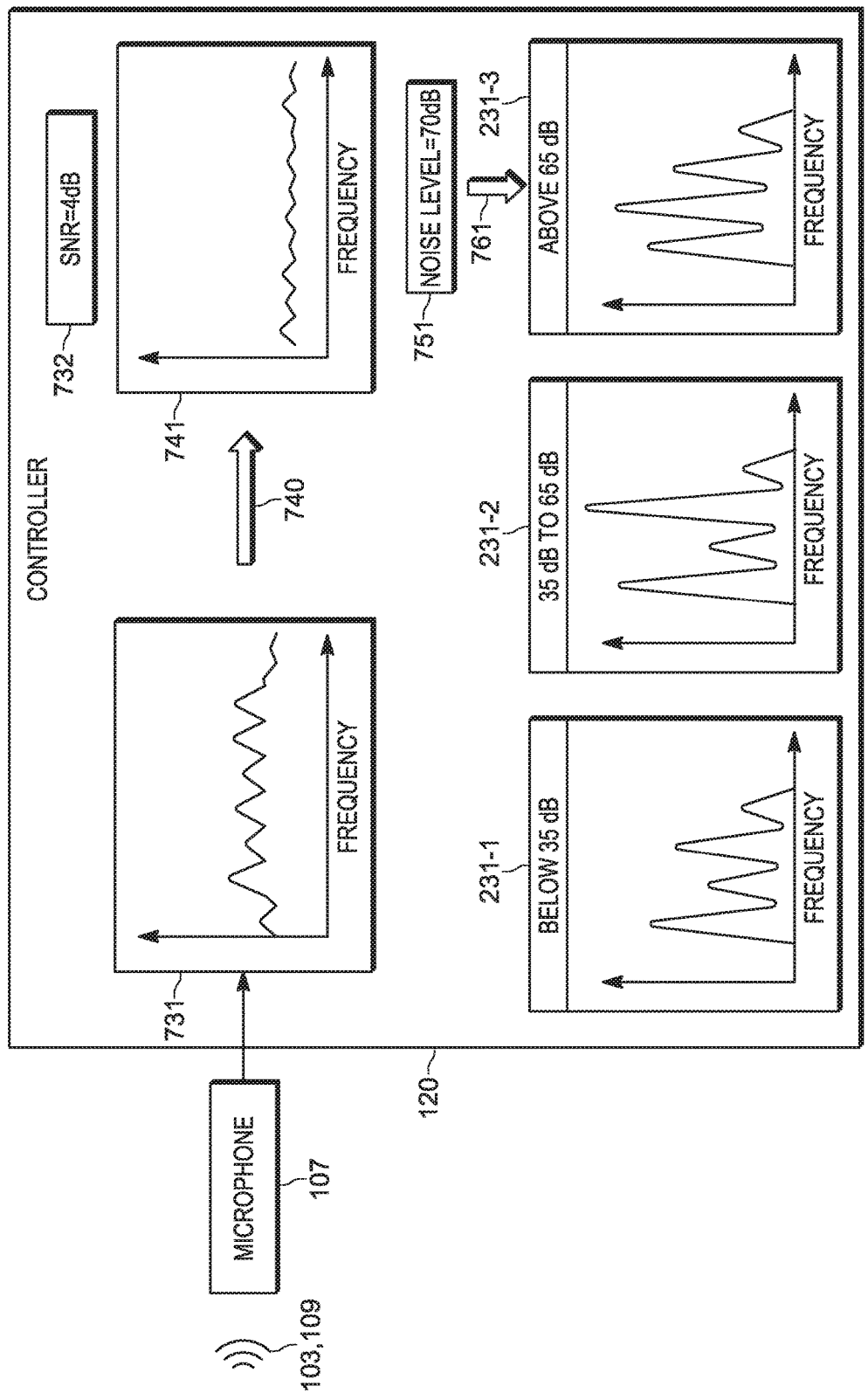
FIG. 7 depicts a controller of the audio device selecting a voice tag based on the ambient noise level in accordance with some embodiments.

Attention is next directed to FIG. 7 which schematically depicts the microphone 107 receiving sound that is a mixture of the speech 103 and the noise 109. Furthermore, the controller 120 receives (e.g. at the block 502) data 731 and/or a signal from the microphone 107, the data 731 being indicative of the speech 103 and the noise 109 received at the microphone 107. As depicted, the data 731 comprises a frequency curve (e.g. amplitude of sound as a function of frequency).

As further schematically depicted in FIG. 7, the controller 120 determines (e.g. at the blocks 408, 504, and represented by the arrow 740), the SNR of the noise 109 and the speech 103; as depicted, the SNR is about 4 dB, and hence a "NO" decision occurs at the block 410 (e.g. assuming that 4 dB is below a threshold SNR, for example about 5 dB).

As further schematically depicted in FIG. 7, the controller 120 determines (as further represented by the arrow 740) a spectrum 741 of the noise 109 using any suitable noise determination technique including, but not limited to, sampling the noise 109 at the microphone 107 when the speech 103 is not being received and/or separating/filtering the noise 109 from the speech 103 in the data 731.

From the spectrum 741, and the like, the controller 120 (e.g. at the block 414) determines (as yet further represented by the arrow 740) a noise level 751 of the noise 109. As depicted, the noise level 751 is 70 dB. Hence, as also depicted in FIG. 7, the controller 120 selects (e.g. at the block 416, the selection represented by the arrow 761) the voice tag 231-1, from the plurality of voice tags 231-1, 231-2, 231-3 each associated with respective noise levels. For example, the voice tag 231-1 is associated with noise levels below 35 dB, the voice tag 230-2 is associated with noise levels between 35 dB and 65 dB, and the voice tag 231-3 is associated with noise levels above 65 dB. Hence, as the noise level 751 of the noise 109 (e.g. ambient noise) is above 65 dB, the controller 120 selects the voice tag 231-3 as being representative how the user 105 speaks according to the Lombard Reflex in such ambient noise environments.

Indeed, as schematically depicted in FIG. 7, each of the voice tags 231 comprises a reference frequency spectrum acquired in a manner similar to that depicted in FIG. 3, and represents voice references of the user 105 that is producing the speech 103. As depicted each of the spectrum of the voice tags 231 are similar, but different frequencies have different amplitudes and/or widths due to the Lombard Reflex; however, it is understood that the spectra depicted in FIG. 7 are schematic only, and that other differences may exist between voice recordings of the voice tags 231.

Figure 8:
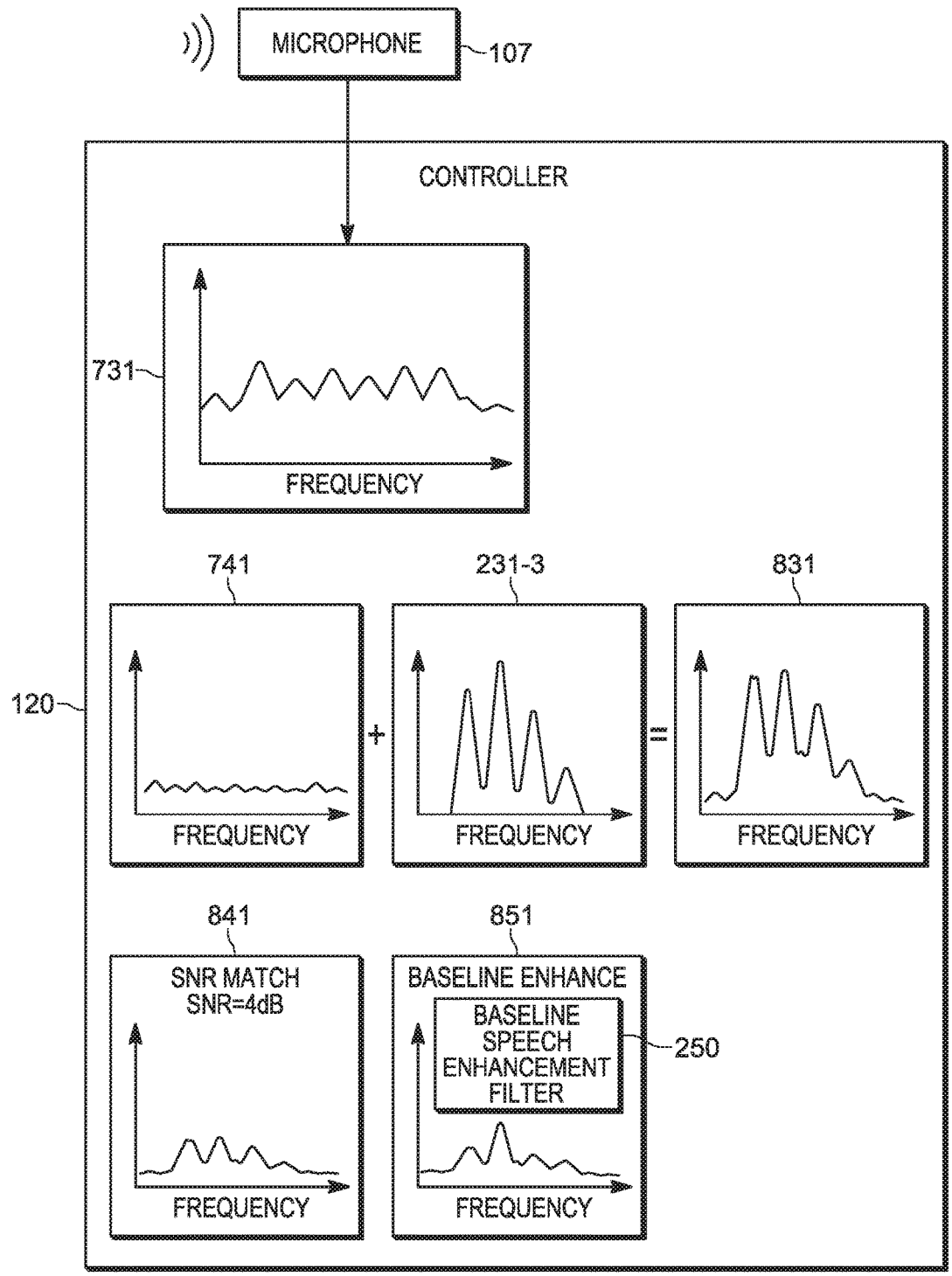
FIG. 8 depicts the controller of the audio device generating a mix of the ambient noise and a selected voice tag in accordance with some embodiments.

Attention is next directed to FIG. 8 which schematically depicts the controller 120 generating (e.g. at the block 506) a mix 831 of the noise in the spectrum 741 and the selected voice tag 231-3; for example, in the mix 831, the spectrum 741 and the selected voice tag 231-3 are added to one another.

The controller 120 adjusts (e.g. at the block 508) the mix 831 to about match the SNR 732, producing an adjusted mix 841; for example, the SNR of the mix 841 is about 4 dB.

The controller 120 enhances (e.g. at the block 510) the mix 841 using the baseline speech enhancement filter 250, producing a baseline enhanced mix 851. As depicted, the baseline enhanced mix 851 has not been enhanced for intelligibility, but merely to reduce noise and the like. Furthermore, the enhance mix 841 is representative of how speech received at the microphone 107 under the associated ambient noise conditions would be transmitted by the transmitter 123.

Figure 9:
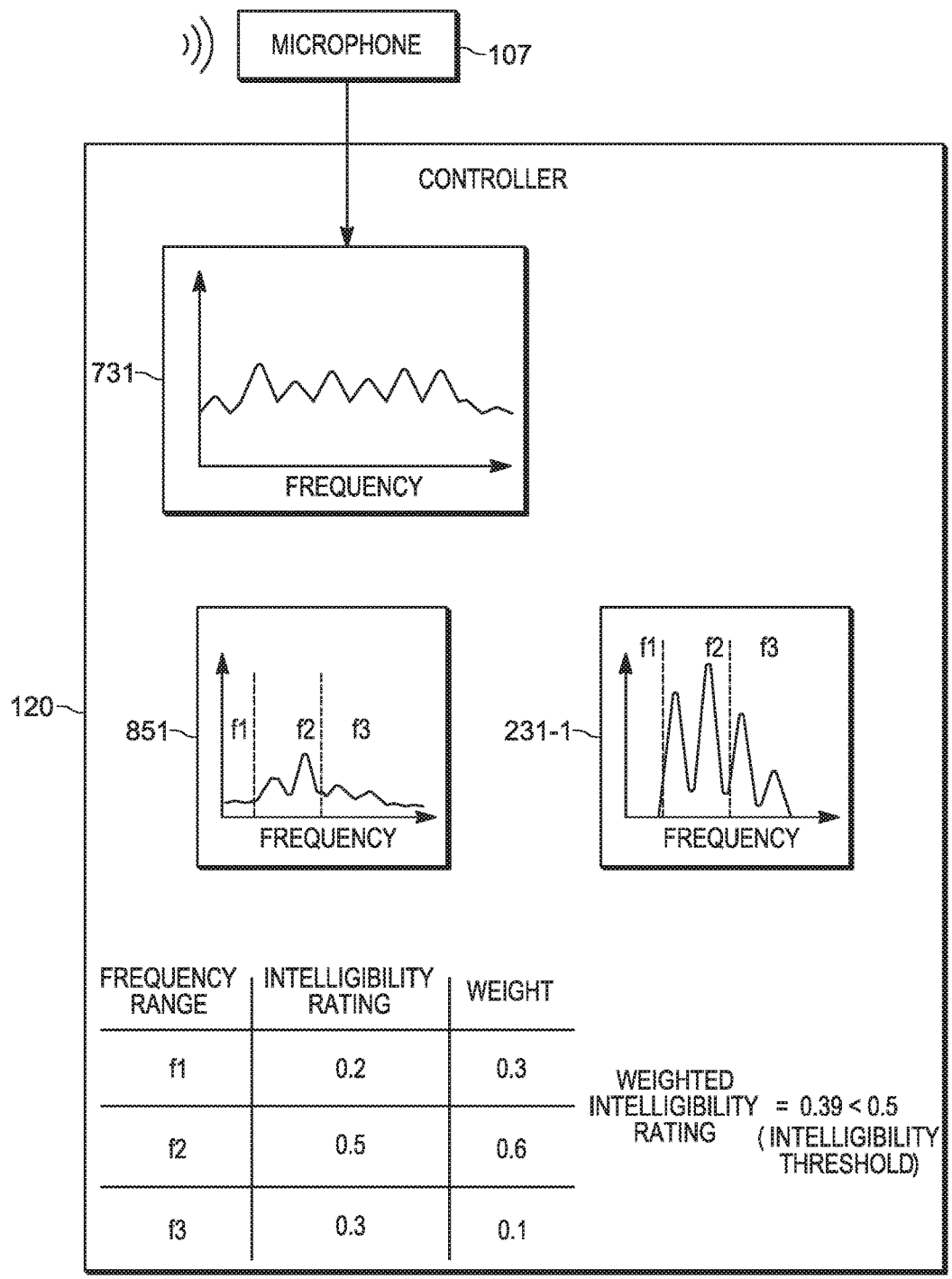
FIG. 9 depicts the controller of the audio device determining an intelligibility rating of the mix of the ambient noise and a selected voice tag in accordance with some embodiments.

Attention is next directed to FIG. 9 which schematically depicts the controller 120 comparing (e.g. at the block 512) the mix 841 with the selected voice tag 231-3, for example in three frequency ranges f1, f2, f3, to determine (e.g. at the blocks 418, 514) an intelligibility rating for each frequency range f1, f2, f3. In general, the selected voice tag 231-3 is used as a reference for how the mix 841 would ideally be transmitted by the transmitter 123. In other words, the controller 120 may determine differences, and the like, between the mix 841 and the selected voice tag 231-3, and use the various analytical techniques available for quantifying speech intelligibility described above, to determine a numeric intelligibility rating for each frequency range f1, f2, f3.

It is assumed in FIG. 9 that the frequency range f2 has a higher weight (e.g. 0.6) than the other frequency ranges f1, f3 (e.g. a weight of 0.3 for f1, and a weight of 0.1 for f3). For example, the frequency range f2 may include a range of about 750 to about 2,381 Hz which has been determined to be an important range for sentence intelligibility. Assuming respective intelligibility ratings of 0.2, 0.5, 0.3 for each frequency range f1, f2, f3, the weighted intelligibility is about 0.39, which is assumed to be less than the intelligibility threshold 260 of 0.5. Hence, at the block 420, the controller 120 determines that the weighted intelligibility is below the intelligibility threshold 260.

Put another way, the controller 120 determines intelligibility of the mix 841 assuming that the selected voice tag 231-3 represents an "ideal" version of the mix 841 produced according to the same Lombard Reflex as the speech 103, as it not possible to compare the data 731 with an "ideal" version of the speech 103.

Figure 10:
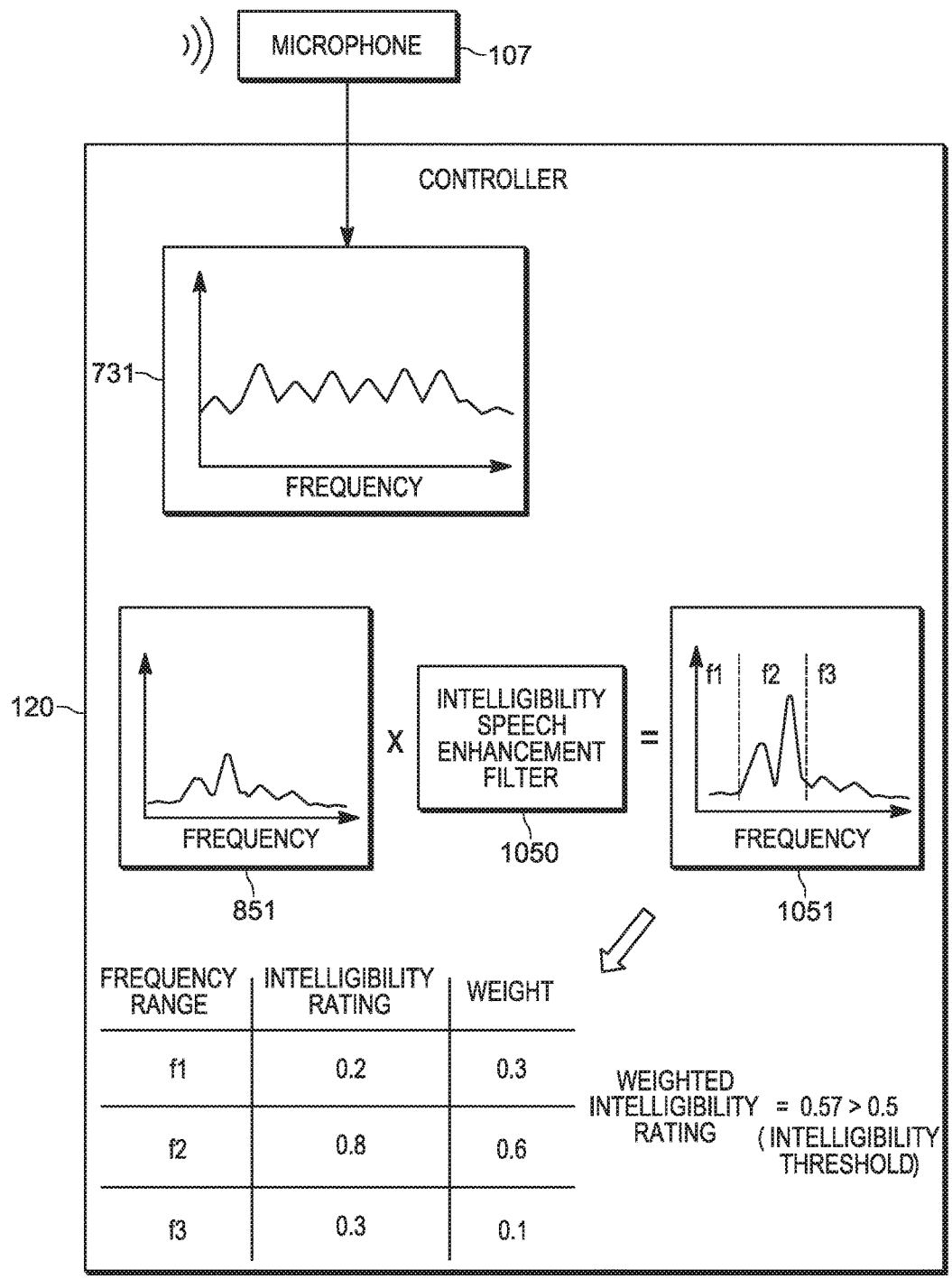
FIG. 10 depicts the controller of the audio device determining an intelligibility speech enhancement filter based on the intelligibility rating in accordance with some embodiments.

Attentions is next directed to FIG. 10 which schematically depicts the controller 120 generating an intelligibility speech enhancement filter 1050 which, when applied to the mix 851, produces (e.g. at the block 428) an intelligibility speech enhanced mix 1051 that has an increased intelligibility rating (e.g. as depicted 0.57, and determined at the block 428), presuming the intelligibility speech enhancement filter 1050 boosts frequencies in the range f2 and/or suppresses noise in the range f2). The intelligibility speech enhancement filter 1050 differs from the baseline speech enhancement filter 250 as the intelligibility speech enhancement filter 1050 is based on the intelligibility rating and/or analysis to determine the intelligibility rating.

For example, as the selected voice tag 231-3 in the mix 851 is indicative how the user 105 changes their speech in a loud ambient environment, and as the other voice tags 231-1, 231-2 represent how the user changes their speech in other ambient noise environments, the intelligibility speech enhancement filter 1050 will change depending on which voice tag 231 is in the mix 851.

While in FIG. 10 the intelligibility speech enhancement filter 1050 is depicted as boosting frequencies in the frequency range f2, the intelligibility speech enhancement filter 1050 may include, but is not limited to, one or more of noise suppression, speech reconstruction, equalization, and the like.

Put another way, the controller 120 may be further configured to enhance the speech received at the microphone 107 based on the intelligibility rating using one or more of noise suppression, speech reconstruction and an equalizer (e.g. at the vocoder application 270).

Figure 11:
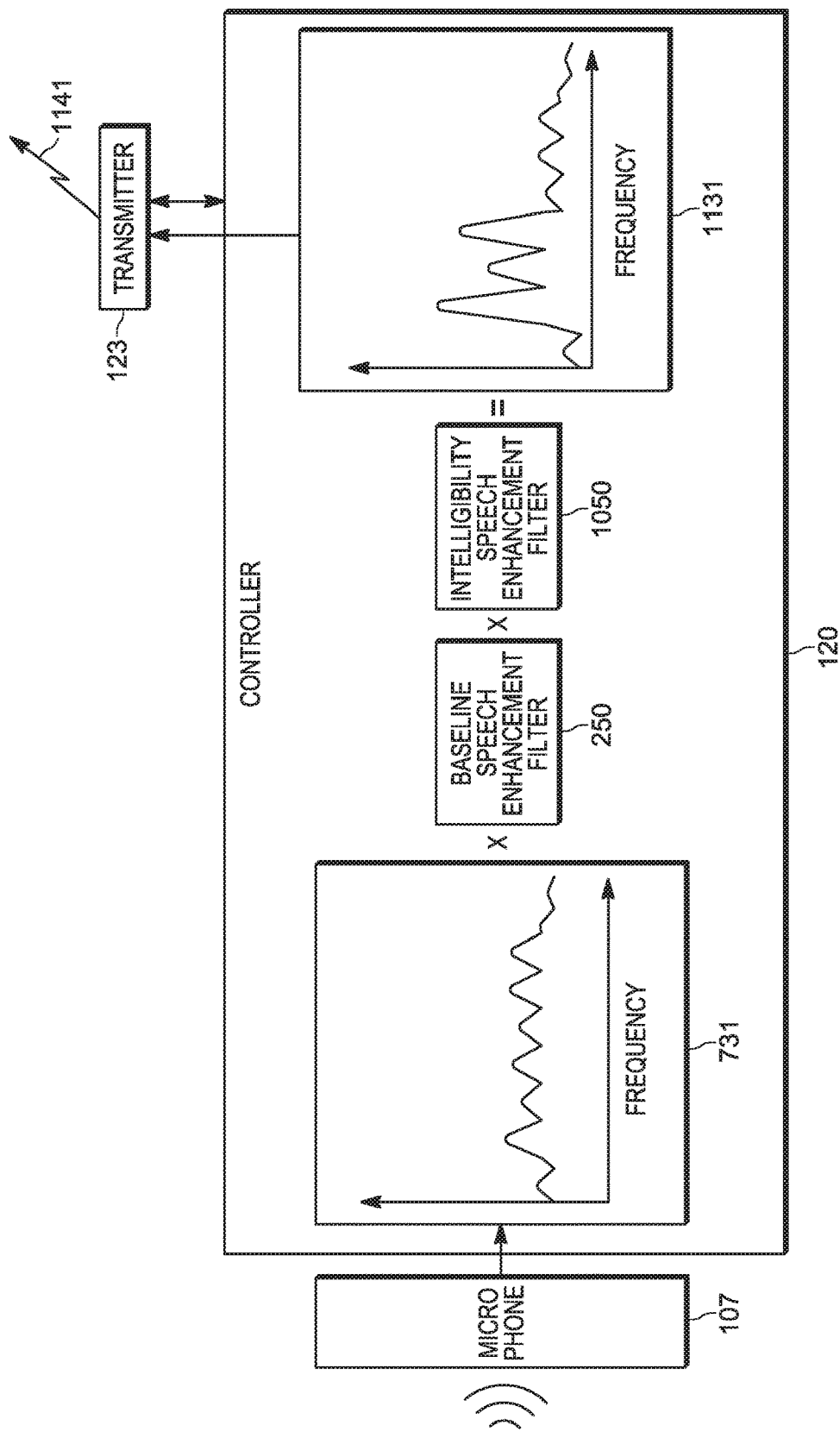
FIG. 11 depicts the controller of the audio device using the intelligibility speech enhancement filter to enhance intelligibility of speech encoded in transmitted signals in accordance with some embodiments.

Attention is next directed to FIG. 11 which schematically depicts the controller 120 enhancing (e.g. at the block 424) the speech 103 by applying both the baseline speech enhancement filter 250 and the intelligibility speech enhancement filter 1050 to the data 731 to produce data 1131, which represents the speech 103/noise 109 combination enhanced for intelligibility and/or intelligibility enhanced speech. FIG. 11 further depicts the data 1131 being provided to the transmitter 123 which transmits a signal 1141 which represents the intelligibility enhanced speech of the data 1131.

Figure 12:
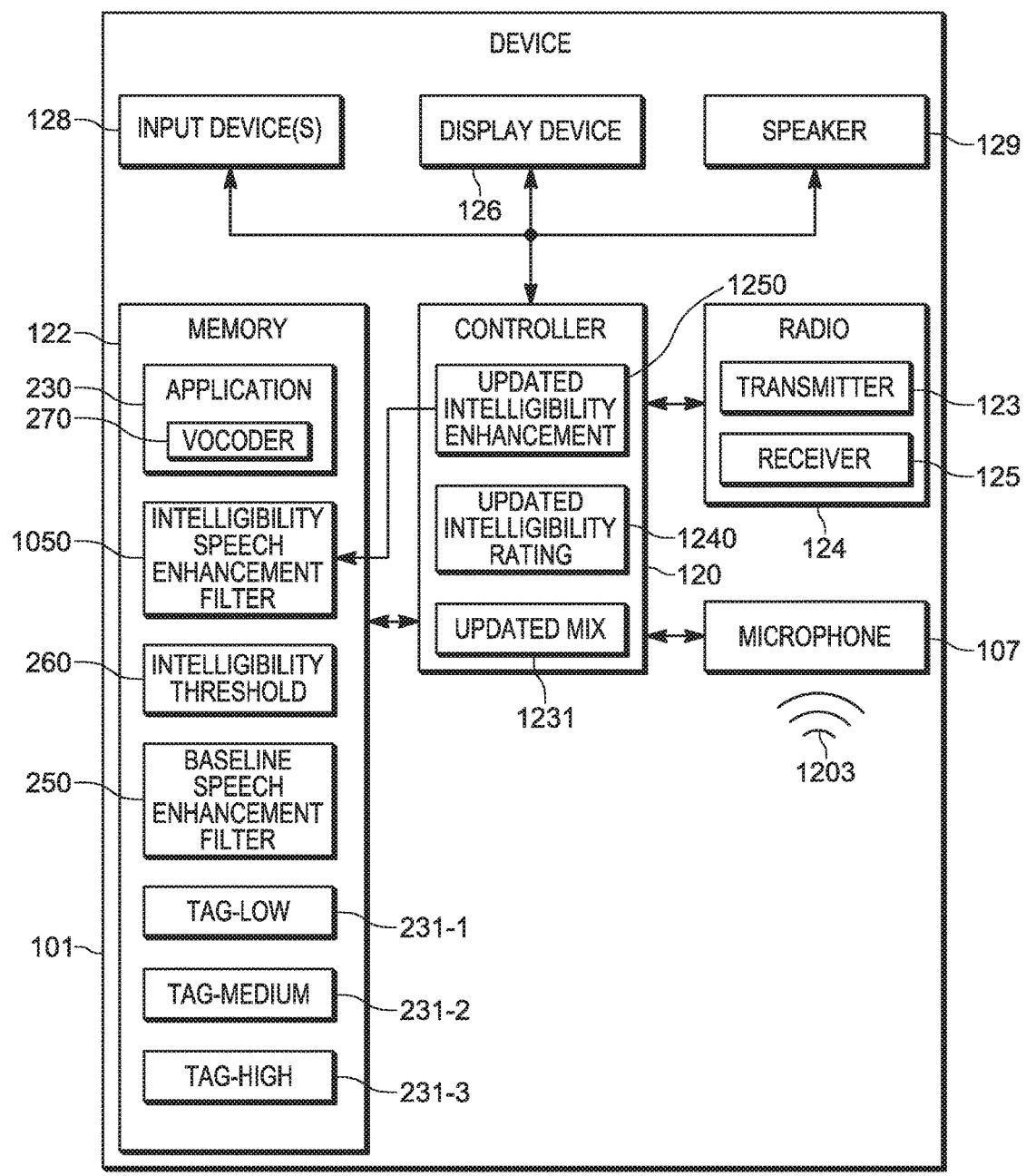
FIG. 12 depicts the audio device iteratively determining an intelligibility rating and updating the intelligibility speech enhancement filter in accordance with some embodiments.

Attention is next directed to FIG. 12 which is substantially similar to FIG. 2, with like elements having like numbers; however, in FIG. 12, the memory 122 stores the intelligibility speech enhancement filter 1050 (which may occur at the block 422 and/or the block 516). As depicted, the microphone 107 receives further speech 1203 (e.g. mixed with noise), the controller generates an updated mix 1231, similar to the mix 851, but using current noise received with the speech 1203, and generates an updated intelligibility rating 1240. From the updated intelligibility rating 1240, the controller 120 generates an updated intelligibility enhancement filter 1250 which is used to update the intelligibility speech enhancement filter 1050 stored at the memory 122 by replacing the intelligibility speech enhancement filter 1050 and/or by updating settings, and/or portions of the intelligibility speech enhancement filter 1050.

Hence, the controller 120 iteratively attempts to improve intelligibility of speech received at the microphone 107.

Figure 13:
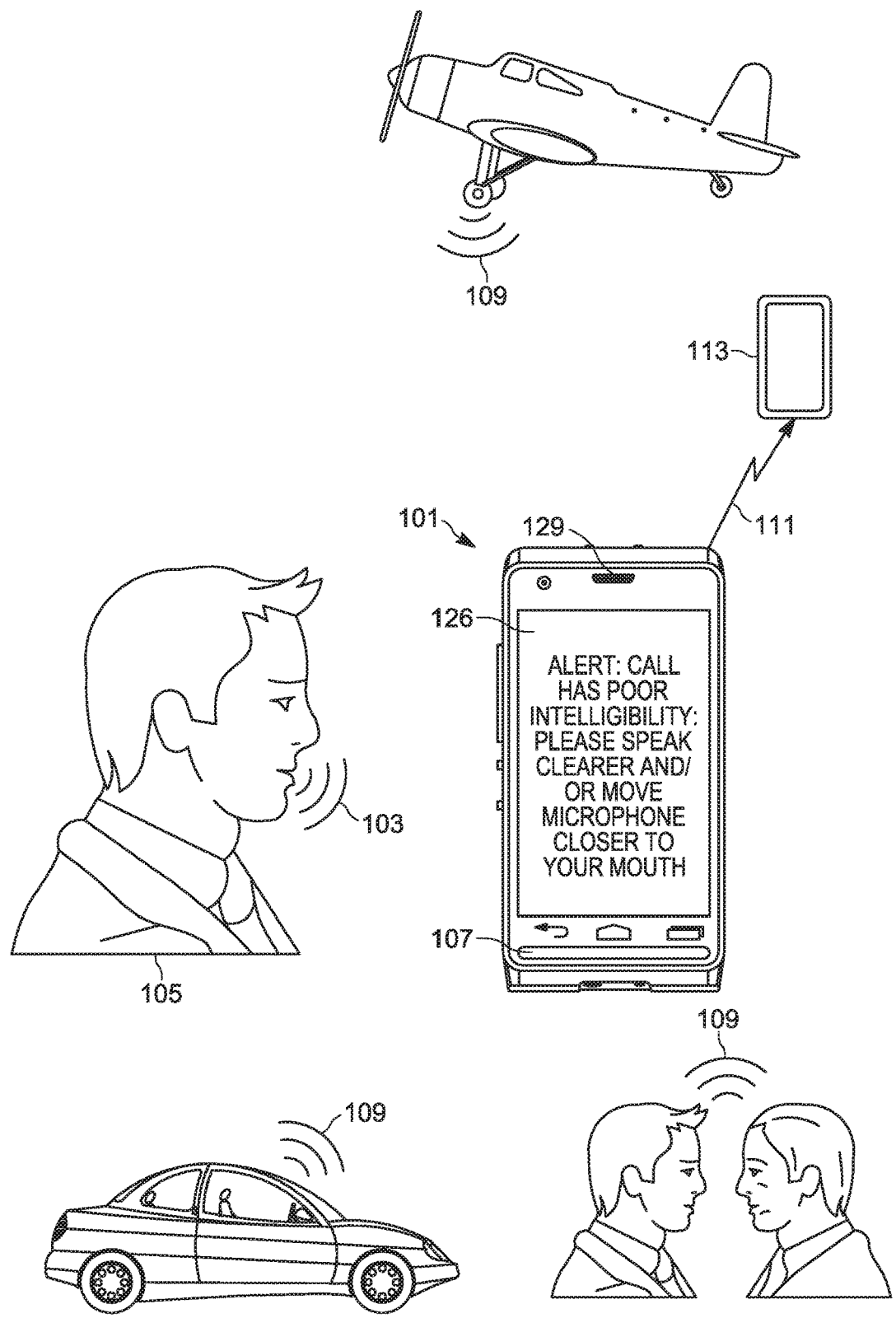
FIG. 13 depicts the audio device providing a prompt for the user to change his speaking behavior and/or move the microphone when the intelligibility rating remains below a threshold intelligibility in accordance with some embodiments.

Turning to FIG. 13, which is substantially similar to FIG. 1, with like elements having like numbers, when the intelligibility speech enhancement filter 1050 and/or the updated intelligibility enhancement filter 1250 fails to cause the intelligibility rating of the intelligibility speech enhanced mix 1051 to be above the intelligibility threshold (e.g. a "NO" decision at the block 430 of the method 400) the controller 120 may control a notification device to prompt the user 105 to change one or more of a speaking behavior and a position of the microphone 107. For example, as depicted the controller 120 is controlling the display device 126 to render a prompt in the form of text "ALERT: CALL HAS POOR INTELLIGIBILITY: PLEASE SPEAK CLEARER AND/OR MOVE MICROPHONE CLOSER TO YOUR MOUTH". Such an alert may alternatively be provided at the speaker 129 (and/or the headphones 350, when present), and/or any other notification device at the device 101. Such a prompt may cause the user 105 to move the microphone 107 closer to (or further from) their mouth and/or to speak clearer.

Hence, provided in the present specification is a device and method for adjusting speech intelligibility at an audio device in which customized reference voice tags are provisioned at the device, for a plurality of ambient noise levels, to capture how a user changes their speaking behavior due the Lombard Reflex. When the same user is on a call, the device samples the ambient noise and produces a quantitative intelligibility rating of the ambient noise mixed with the voice tag corresponding to that noise level. When the intelligibility rating is below a threshold intelligibility, the device adjusts the speech transmitted based on the intelligibility rating, for example, based on a filter that increases the intelligibility rating of the ambient noise mixed with the voice tag.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
   a microphone;
   a transmitter; and
   a controller having access to a memory storing a plurality of preconfigured voice tags associated with respective noise levels, each of the plurality of preconfigured voice tags comprising a respective voice recording of a given user,
   the controller configured to:
      determine a noise level at the microphone;
      select a voice tag, of the plurality of preconfigured voice tags, based on the noise-level;
      determine an intelligibility rating of a mix of the voice tag and noise received at the microphone; and
      when the intelligibility rating is below a threshold intelligibility rating, enhance speech from the given user received at the microphone based on the intelligibility rating prior to transmitting, at the transmitter, a signal representing intelligibility enhanced speech.

2. The device of claim 1, wherein each of respective voice recordings of the plurality of preconfigured voice tags are associated with a respective Lombard Speech Level.

3. The device of claim 1, wherein the controller is further configured to, prior to determining the intelligibility rating of the mix:
   determine a signal-to-noise ratio of the speech received at the microphone;
   match the mix to the signal-to-noise ratio of the speech received at the microphone; and
   enhance the mix of the voice tag and the noise using a baseline speech enhancement filter.

4. The device of claim 1, wherein the controller is further configured to determine the intelligibility rating of the mix of the voice tag and the noise received at the microphone by:
   comparing the mix, enhanced using a baseline speech enhancement filter, with the voice tag.

5. The device of claim 1, wherein the controller is further configured to determine the intelligibility rating of the mix by:
   binning the mix based on frequency;
   determining respective intelligibility ratings for a plurality of bins; and
   averaging the respective intelligibility ratings.

6. The device of claim 5, wherein the averaging of the respective intelligibility rating comprises a weighted averaging.

7. The device of claim 1, wherein the controller is further configured to determine the intelligibility rating of the mix by determining one or more of:
   amplitude modulation at different frequencies in the mix;
   speech presence or speech absence at different frequencies in the mix;
   respective noise levels at the different frequencies;
   respective reverberation at the different frequencies;
   respective signal-to-noise ratio at the different frequencies;
   speech coherence at the different frequencies; and
   speech distortion at the different frequencies.

8. The device of claim 1, wherein the controller is further configured to enhance the speech received at the microphone based on the intelligibility rating using one or more of noise suppression, speech reconstruction and an equalizer.

9. The device of claim 1, wherein the controller is further configured to:
   continue to determine the intelligibility rating of further speech received at the microphone; and
   when the intelligibility rating remains below the threshold intelligibility rating, control a notification device to prompt a user to change one or more of a speaking behavior and a position of the microphone.

10. A method comprising:
    determining, at a controller of a device, a noise level at a microphone of the device;
    selecting, at the controller, a voice tag, of a plurality of preconfigured voice tags, based on the noise level, each of the plurality of preconfigured voice tags associated with respective noise levels, the plurality of preconfigured voice tags stored at a memory accessible to the controller, each of the plurality of preconfigured voice tags comprising a respective voice recording of a given user;
    determining, at the controller, an intelligibility rating of a mix of the voice tag and noise received at the microphone; and
    when the intelligibility rating is below a threshold intelligibility rating, enhancing, using the controller, speech of the given user received the microphone based on the intelligibility rating prior to transmitting, at a transmitter of the device, a signal representing intelligibility enhanced speech.

11. The method of claim 10, wherein each of respective voice recordings of the plurality of preconfigured voice tags are associated with a respective Lombard Speech Level.

12. The method of claim 10, further comprising, prior to determining the intelligibility rating of the mix:
    determining, at the controller, a signal-to-noise ratio of the speech received at the microphone;
    matching, at the controller, the mix to the signal-to-noise ratio of the speech received at the microphone; and
    enhancing, at the controller, the mix of the voice tag and the noise using a baseline speech enhancement filter.

13. The method of claim 10, further comprising determining the intelligibility rating of the mix of the voice tag and the noise received at the microphone by:
    comparing the mix, enhanced using a baseline speech enhancement filter, with the voice tag.

14. The method of claim 10, wherein the controller is further configured to determine the intelligibility rating of the mix by:
    binning, at the controller, the mix based on frequency;
    determining, at the controller, respective intelligibility ratings for a plurality of bins; and averaging, at the controller, the respective intelligibility ratings.

15. The method of claim 14, wherein the averaging of the respective intelligibility rating comprises a weighted averaging.

16. The method of claim 10, further comprising determining the intelligibility rating of the mix by determining, at the controller, one or more of:
- amplitude modulation at different frequencies in the mix;
- speech presence or speech absence at different frequencies in the mix;
- respective noise levels at the different frequencies;
- respective reverberation at the different frequencies;
- respective signal-to-noise ratio at the different frequencies;
- speech coherence at the different frequencies; and
- speech distortion at the different frequencies.

17. The method of claim 10, further comprising enhancing, at the controller, the speech received at the microphone based on the intelligibility rating using one or more of noise suppression, speech reconstruction and an equalizer.

18. The method of claim 10, further comprising:
- continuing to determine, at the controller, the intelligibility rating of further speech received at the microphone; and
- when the intelligibility rating remains below the threshold intelligibility rating, controlling, at the controller, a notification device to prompt a user to change one or more of a speaking behavior and a position of the microphone.

19. The device of claim 1, wherein each of respective voice recordings of the plurality of preconfigured voice tags are recorded at different speaking levels associated with an associated respective noise level.

20. The method of claim 10, wherein each of respective voice recordings of the plurality of preconfigured voice tags are recorded at different speaking levels associated with an associated respective noise level.

* * * * *